(12) United States Patent
Park et al.

(10) Patent No.: US 7,235,193 B2
(45) Date of Patent: Jun. 26, 2007

(54) COMPLEX LITHIUM METAL OXIDES WITH ENHANCED CYCLE LIFE AND SAFETY AND A PROCESS FOR PREPARATION THEREOF

(75) Inventors: Hong-Kyu Park, Daejeon (KR); Yong Hoon Kwon, Gyeonggi-do (KR); Seong Yong Park, Daejeon (KR); Jin On Kim, Daejeon (KR); Ki Young Lee, Daejeon (KR)

(73) Assignee: LG Chem. Ltd., Seoul (KR)

( * ) Notice: Subject to any disclaimer, the term of this patent is extended or adjusted under 35 U.S.C. 154(b) by 534 days.

(21) Appl. No.: 10/487,861

(22) PCT Filed: Apr. 22, 2003

(86) PCT No.: PCT/KR03/00815

§ 371 (c)(1),
(2), (4) Date: Feb. 26, 2004

(87) PCT Pub. No.: WO03/092099

PCT Pub. Date: Nov. 6, 2003

(65) Prior Publication Data

US 2004/0200998 A1    Oct. 14, 2004

(30) Foreign Application Priority Data

Apr. 23, 2002    (KR) .................. 10-2002-0022167

(51) Int. Cl.
*H01M 4/52*    (2006.01)
*C01G 51/04*    (2006.01)
*B32B 15/02*    (2006.01)
*B05D 5/12*    (2006.01)

(52) U.S. Cl. .................. 252/521.2; 252/182.1; 252/519.1; 252/500; 429/231.3; 429/231.1; 423/594.5; 428/402; 428/403; 427/126.3; 427/126.6

(58) Field of Classification Search ............ 252/518.1, 252/519.1, 182.1; 429/221, 223, 224, 231.1, 429/231.3; 428/403, 404; 423/594.5, 594.3, 423/594.19, 599; 427/126.3, 126.6
See application file for complete search history.

(56) References Cited

U.S. PATENT DOCUMENTS 5,609,975 A    3/1997    Hasegawa et al.

(Continued)

FOREIGN PATENT DOCUMENTS

JP            10-236826    *    9/1998

(Continued)

*Primary Examiner*—Mark Kopec
*Assistant Examiner*—Kallambella Vijayakumar
(74) *Attorney, Agent, or Firm*—Birch, Stewart, Kolasch & Birch, LLP

(57) ABSTRACT

This invention relates to complex lithium metal oxides, which are cathode active materials of a lithium or lithium ion secondary battery with enhanced cycle life and safety, and a process for preparation thereof. The core particles are complex lithium metal oxides capable of absorbing, storing and emitting lithium ions, and a coating layer comprised of amorphous complex lithium cobalt oxides that are formed on the surface of the core particle, which is structurally stable and inactive with electrolytes. Because the amorphous complex lithium cobalt oxides are inactive with electrolytes, the oxides stabilize the surface structure of the complex lithium metal oxide and improve on high temperature storage properties, as well as safety and cycle life.

11 Claims, 3 Drawing Sheets

U.S. PATENT DOCUMENTS

| | | | |
|---|---|---|---|
| 5,686,203 A * | 11/1997 | Idota et al. | 429/342 |
| 5,718,989 A | 2/1998 | Aoki et al. | |
| 5,783,333 A | 7/1998 | Mayer | |
| 6,071,649 A * | 6/2000 | Mao et al. | 429/231.3 |
| 6,555,269 B2 * | 4/2003 | Cho et al. | 429/231.1 |
| 6,881,520 B1 * | 4/2005 | Li | 429/231.1 |
| 2001/0031311 A1 * | 10/2001 | Lee et al. | 427/126.3 |
| 2002/0110518 A1 * | 8/2002 | Okuda et al. | 423/594 |
| 2002/0177002 A1 * | 11/2002 | Fujino et al. | 428/469 |

FOREIGN PATENT DOCUMENTS

| | | | |
|---|---|---|---|
| JP | 2000-169152 | * | 6/2000 |
| JP | 2000-195517 | * | 7/2000 |

* cited by examiner

COMPLEX LITHIUM METAL OXIDES WITH ENHANCED CYCLE LIFE AND SAFETY AND A PROCESS FOR PREPARATION THEREOF

FIELD OF INVENTION

The present invention relates to cathode active materials for lithium or lithium ion secondary batteries and a method for preparation thereof In particular, the present invention relates to a cathode active material that enhances high temperature storage properties, cycle life, and safety of the battery by forming an outer layer with amorphous complex lithium cobalt oxides on the surface of complex lithium metal oxides, which are used as the cathode active material, and a method for preparing the same cathode active material.

BACKGROUND OF INVENTION

In the lithium ion secondary battery, safety and high temperature storage properties, as well as the cycle life at room temperature and at high temperatures, are essential to the application of the battery. The factors that most affect these elements are the characteristics of the cathode active materials and anode active materials. Recently, there has been much development in the field of anode active materials, while there are many problems to be improved upon in the field of cathode active materials. In particular, safety and high temperature storage properties of a battery depend on cathode active materials. As standard cathode active materials for the above lithium ion secondary battery, $LiCoO_2$, $LiNiO_2$, and $LiMn_2O_4$ have been known. Although $LiNiO_2$ has the highest discharge capacity, problems arise in applying this material to practical use due to difficulties in synthesis and thermal safety. $LiMn_2O_4$ is relatively low in price and does not harm the environment, but cannot be used alone, since it has a small specific capacity. $LiCoO_2$ has been used commercially for it has a high battery voltage and excellent electrode characteristics. However, it has poor storage properties at high temperatures. In order to resolve these problems, much research has been performed. According to Japanese Unexamined Patent Publication No. Hei 11-317230, the cycle life and safety of a battery have been enhanced by a metal oxide coating. In the $LiNiO_2$ system, structural safety is improved by use of several dopants. In addition, safety of the battery is improved by improving thermal safety. Safety and cycle life of the battery are also improved by adding an additive to an electrolyte. However, such improvements do not affect storage properties and cycle life at high temperatures.

SUMMARY OF INVENTION

The present invention resolves the problems, which have been raised with respect to cycle life, safety and storage properties of a battery when a cathode active material is subject to room temperature and high temperatures. In order to resolve these problems, the present invention provides a cathode active material that improves cycle life, safety and high temperature storage properties of a lithium ion secondary battery. In order to obtain such a cathode active material, the present invention improves structural safety and electrochemical characteristics of the battery by forming a coating layer on the cathode active material with amorphous complex lithium cobalt oxides.

DETAILED DESCRIPTION OF INVENTION

Figure 1:
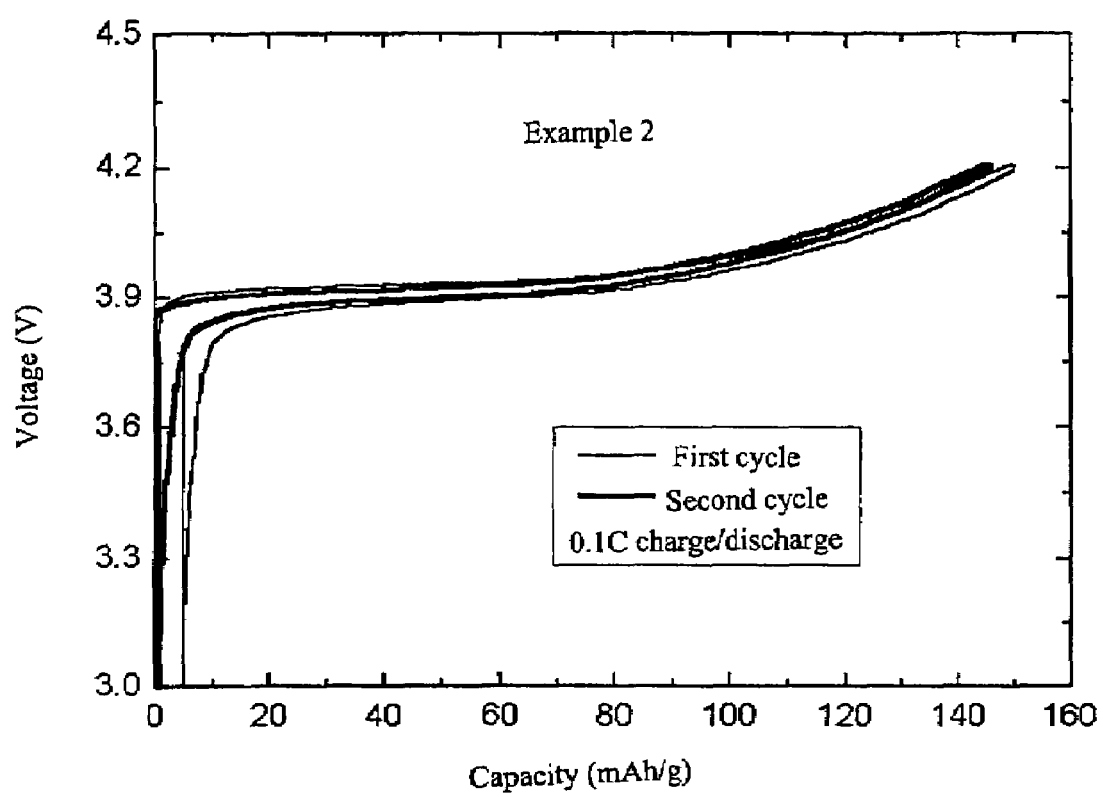
FIG. 1 is a graph showing charge and discharge characteristics of complex lithium cobalt oxides that form an amorphous coating layer on a core particle $LiCoO_2$. The outer coating layer in the prior art deteriorated in capacity, since it did not contain lithium. However, the present invention prevents such capacity deterioration occurring after coating, by forming amorphous complex lithium metal oxides on the outer layer. The amorphous lithium metal oxides have reversible capacity.
Figure 2:
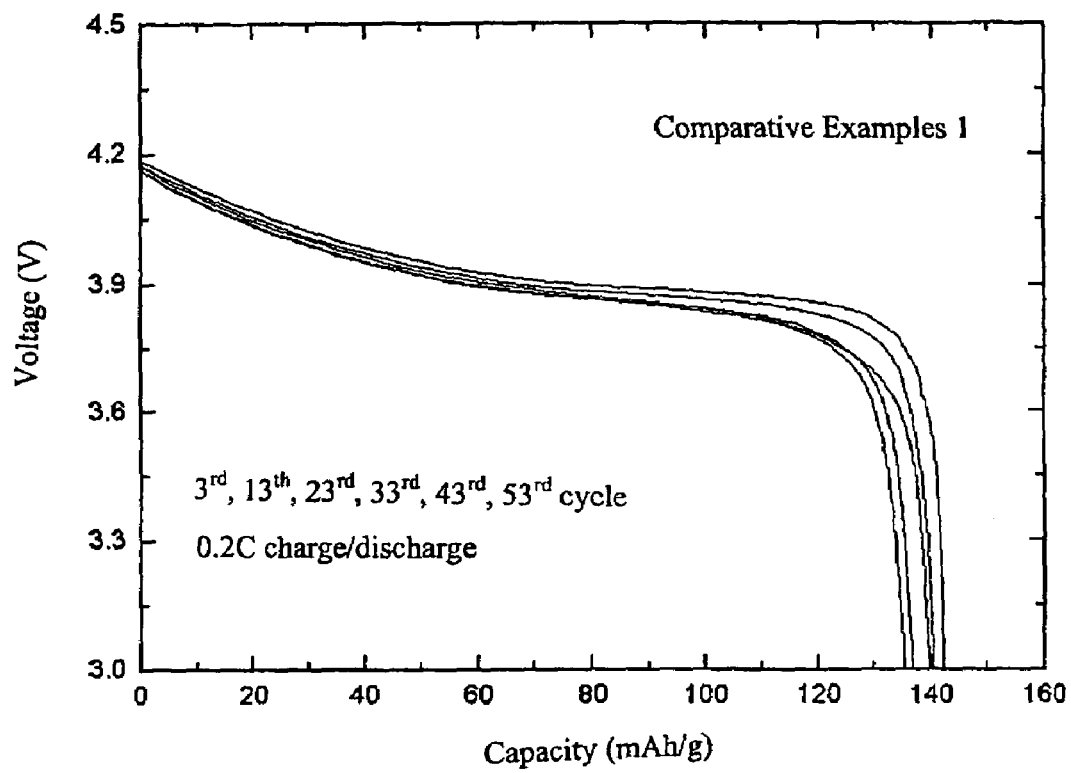
FIG. 2 is a graph showing discharge curves in their cycles. IR drop of the discharge curves in their cycles is significantly reduced.
Figure 2:
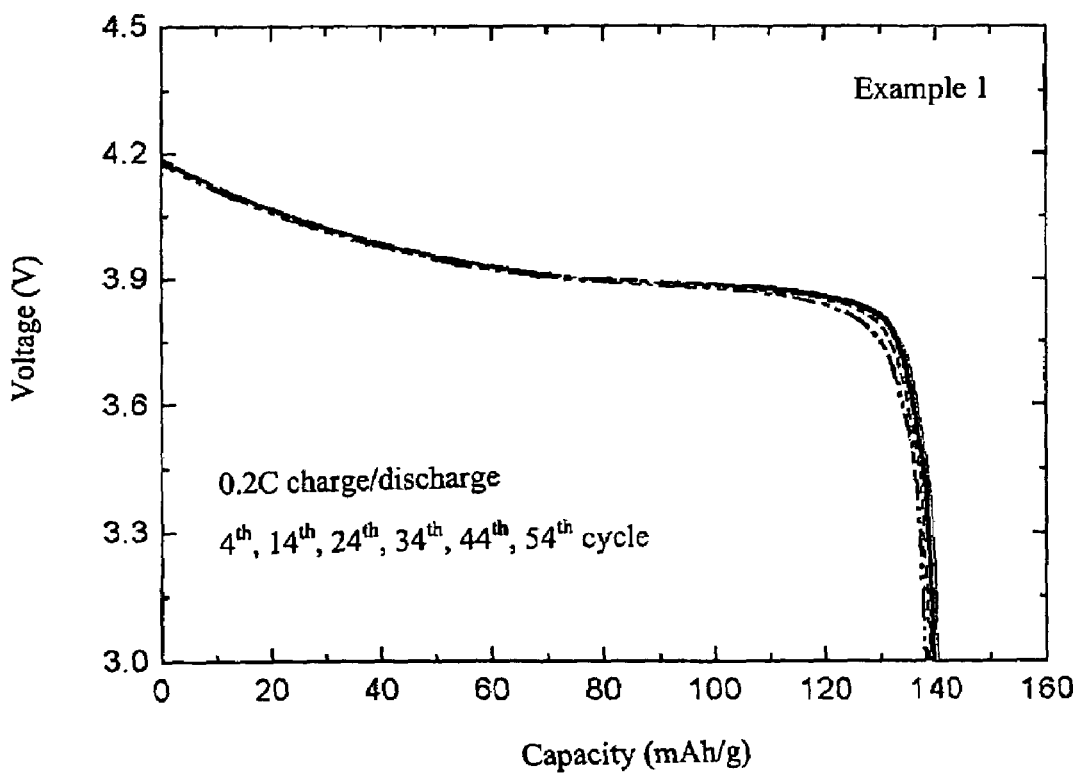
Figure 3:
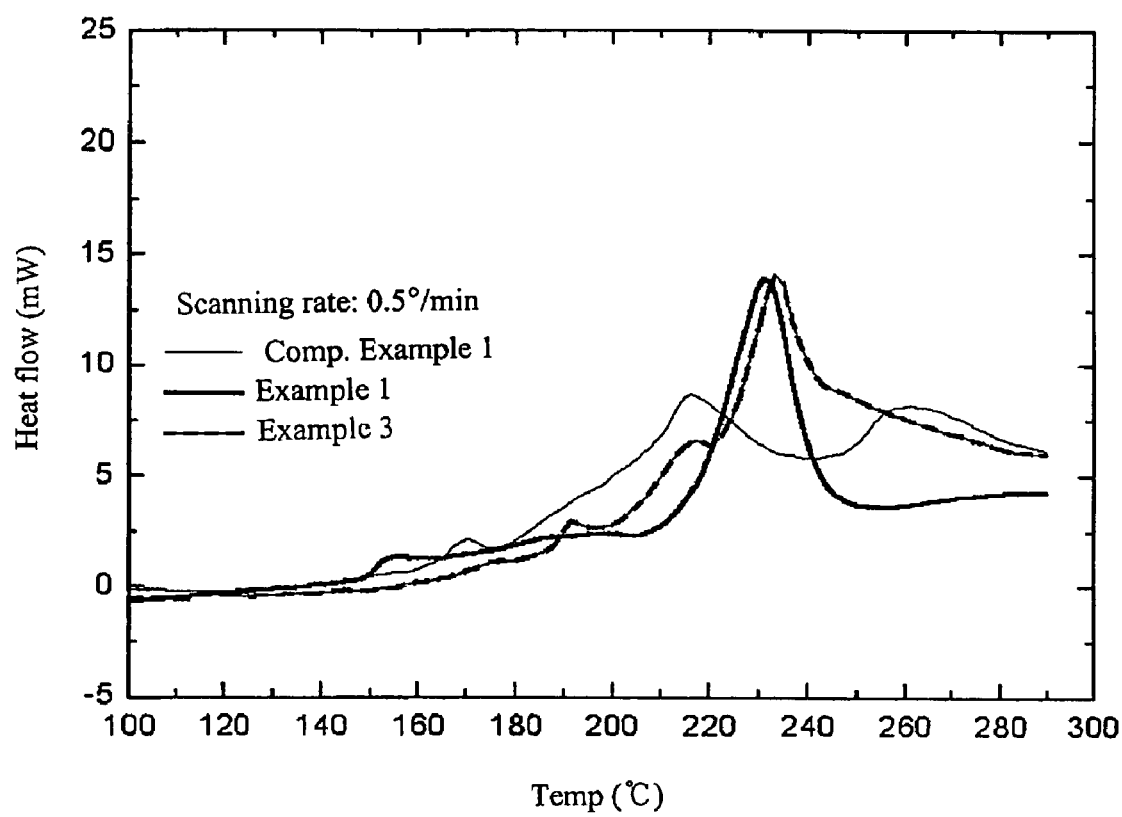
FIG. 3 is a graph showing the results of the analysis of a calorific value of the complex lithium cobalt oxides performed by use of a Differential Scanning Calorimeter (DSC). The calorific value is based on the temperature of complex lithium cobalt oxides obtained by decomposing a battery after charging the battery up to 4.2V When coating was performed, the initial temperature upon heat generation was increased and the calorific value was decreased. Therefore, it is possible to improve safety of the battery by inhibiting ignition of the battery, which is caused by heat generation at the cathode.

The present invention relates to a method of reforming a surface by forming a coating layer on the surface of complex lithium metal oxides in order to achieve the above-mentioned object. This method for the preparation of the metal oxides comprises the following steps:

1) providing complex lithium metal oxides;
2) after thermal treatment, providing a mixture of coating layer feedstocks which form a coating layer made of amorphous complex lithium cobalt oxides;
3) coating the complex lithium metal oxides of step 1) with the mixture of step 2); and
4) calcinating the coated complex lithium metal oxides of step 3).

In addition, the present invention provides a lithium or lithium ion secondary battery that uses complex lithium metal oxides prepared by the above method as a cathode active material.

The present invention relates to obtaining a cathode active material that comprises core particles capable of absorbing, storing and emitting lithium ions, and a coating layer made of amorphous complex lithium metal oxides, which have low electric conductivity, and thus have low reactivity with an electrolyte. Complex lithium metal oxides, which have a voltage of 3.0V or more for lithium, or complex lithium cobalt oxides ($LiCoO_2$) are used as core particles. The coating layer is amorphous oxides comprising lithium cobalt oxides of formula $Li_{1+x}Co_{1-x-y}A_yO_2$, wherein $0 \leq x \leq 0.1$, and $0 \leq y \leq 0.5$. A is selected from at least one of Al, B, Mg, Ca, Sr, Ba, Na, Cr, Gd, Ga, Ni, Co, Fe, V, Cr, Ti, Sn, Mn, Zr and Zn.

The method for coating the surface of complex lithium metal oxides, which are the core particle, with amorphous complex lithium cobalt oxides can be carried out as follows. A homogeneously mixed solution is prepared by mixing the compounds, which will be used as raw material for forming amorphous complex lithium cobalt oxides, in a desired compositional ratio. At this time, at least one of carbonate, nitrate, oxalate, sulfate, acetate, citrate, chloride, hydroxide, and oxide of the above metallic element or a mixture thereof can be used as raw material for forming the coating layer. In particular, an organic solvent such as alcohol or a water-soluble solvent is preferably used to prepare a homogeneous mixture. At step 2), the amount of the coating layer ranges between 0.01~10 mol % based on the core particles, assuming that the mixture for forming the coating layer is oxidized after thermal treatment. This coating method produces a slurry by adding a powder of complex lithium metal oxides, which are core particles, to a suspension (sol) of an organic solution or an aqueous solution of the compounds used as raw material for forming amorphous complex lithium cobalt oxides. By applying heat to the slurry during stirring by a stirrer, the compounds for forming amorphous complex lithium cobalt oxides are coated on the surface of the powder of complex lithium metal oxides during vaporization of the solvent. By subjecting the heat treatment to the coated complex lithium metal oxide powder at a temperature ranging from 200° C.~800° C. in the presence of a mixed gas containing air or 10% $O_2$, amorphous complex lithium cobalt oxides are formed on the surface. At this time, the flow rate of the gas ranges between 0.05~2.0 l/g·h (volume per weight and hour). The heat treatment can be carried out for 0.1~10 hours, and most preferably 1~5 hours. The period of time and temperature for the heat treatment can be adjusted within the above-mentioned ranges depending on the situation. A portion of the surface layer can be crystallized depending on the temperature of the heat treatment, and some elements may be doped on the surface of the core particle during the heat treatment.

In another coating method, a suspension of an aqueous solution or an organic solution, in which a mixture of feedstocks for forming amorphous complex lithium cobalt oxides is dissolved, is sprayed on the surface of the core particles made of complex lithium metal oxides, and then dried to form a coating. By floating and fluidizing the core particles in the air, the suspension of a mixed solution is sprayed to form the coating. At the same time, the coating is dried by adjusting the temperature of the flowing air. By treating the dried coating with heat under the above-mentioned conditions, complex lithium metal oxides coated with amorphous complex lithium cobalt oxides are obtained.

Dip coating is a more simplified coating method, in which complex lithium metal oxides (i.e., the core particles) are kept in a suspension of an organic solution or an aqueous solution in which dissolved feedstocks for forming amorphous complex lithium cobalt oxides during a predetermined time of period, are dried and coated. By subjecting the coating to the heat treatment under the above-mentioned conditions, complex lithium metal oxides coated with amorphous complex lithium metal oxides are obtained.

The present invention will be explained on the basis of examples. The following working examples are merely to illustrate the present invention, and not to limit the present invention.

EXAMPLES

Example 1

In order to prepare core particles made of complex lithium metal oxides, $Li_2CO_3$ as a lithium feedstock and $Co_3O_4$ as a cobalt feedstock, were weighed in the molar equivalence ratio of Li:Co of 1.02:1. Ethanol was added thereto as a solvent. By use of a ball mill, $Li_2CO_3$ and $Co_3O_4$ were ground together for 12 hours to be homogenized and then mixed. The mixture was dried for 12 hours in a dryer, and calcinated for 10 hours at 400° C. Then, the mixture was ground and mixed again, and subjected to heat treatment for 10 hours at 900° C. As a result, the core particles $LiCoO_2$ were obtained. The obtained core particles were coated with amorphous complex lithium cobalt oxides in the following manner. In order to provide Li when forming an amorphous coating layer, $LiCH_3CO_2.2H_2O$ was used. In order to provide Co, $Co(CH_2CO_2)_2.4H_2O$ was used. The amount was adjusted in the equivalence ratio of 1.0:1.0. The above feedstocks were dissolved in the ethanol, and stirred for 30 minutes to form a mixture solution containing homogeneous metallic compounds. The amount of the mixture to be formed into a coating layer was adjusted to be 1 mol % for the core particles, assuming that all of the mixture is oxidized after heat treatment. After the mixture to be formed into an amorphous coating layer and the complex lithium cobalt oxides to be formed into core particles were mixed, drying of the solvent and coating of the surface were performed at the same time by subjecting the mixture to heat treatment during stirring. The powder of the coated complex lithium cobalt oxides was subjected to heat treatment by a tube-type furnace at the temperature of 300° C. for 3 hours. The presence of heat treatment was performed in air, and the flow rate of air was 0.1 l/gh.

A slurry was obtained by dispersing the obtained powder of the complex lithium cobalt oxide together with 10% graphite and 5% polyvinylidene fluoride (PVdF) binder in an n-methyl pyrrolidinone (NMP) solvent. The slurry was coated on an aluminum foil. By heating the foil coated with the slurry, the NMP solvent was vaporized and the foil coated with the slurry was dried. A pressure of 500 kg/cm$^2$ was applied to the dried electrode. Then, the electrode was compressed and cut into cells. A solution used as an electrolyte contains 1 mole of $LiPF_6$ dissolved in a solvent containing ethylene carbonate (EC) and ethylmethyl carbonate (EMC) in the ratio of 1:2 by volume.

A half cell is prepared, wherein an electrode prepared in order to measure the cycle life and the high-rate discharge (C-rate) is a cathode, and a lithium metal is used as an anode. The voltage for charge and discharge ranges from 3 to 4.2V. In order to measure the cycle life, the cell was charged and discharged at 0.2C. In order to measure the high-rate discharge, the cell was charged and discharged several times at 0.2C. Then, the capacities of 0.1C, 0.2C, 0.5C, 1C and 2C were measured. Thermal safety of electrode active materials was tested at a rate of 0.5°/min by use of the DSC by applying an electrolyte to a cathode that was obtained by charging it to 4.2V, and then decomposing the battery. The above process was performed in a glove box in order to avoid any contact with air.

Example 2

In order to prepare complex lithium metal oxides used as core particles, $Li_2CO_3$ and $Co(OH)_3$ (lithium and cobalt feedstocks, respectively), and $Al(OH)_3$ to dope Al were used. At this time, they were weighed in the molar equivalence ratio of Li:Co:Al of 1.02:0.95:0.05. Then, these were mixed by adding ethanol as a solvent. By use of a ball mill, the mixture was ground together for 12 hours to be homogenized and then mixed. The mixture was dried for 12 hours in a drier, plasticized for 10 hours at 400° C., and was ground and mixed again. Then, the mixture was subjected to heat treatment for 10 hours at 900° C. to give a core particle made of $LiCo_{0.95}A_{0.05}O_2$. The other conditions were the same as in Example 1.

Example 3

The complex lithium cobalt oxides obtained in Example 1 were used as core particles. In order to form an amorphous oxide coating layer, $Li_2SO_4$ was used as the raw material of Li, and $Co(CH_3CO_2)_2 \cdot 4H_2O$ was used as the raw material of Co. The amount was adjusted to be in the molar equivalence ratio of 1.02:1.0. The process for forming the coating layer and the analysis of the characteristics thereof were performed under the same conditions as in Example 1.

Example 4

The complex lithium cobalt oxides obtained in Example 1 were used as core particles. In order to form an amorphous oxide coating layer, $LiCH_3CO_2 \cdot 2H_2O$ was used as the raw material of Li. $Al(CH_3CO_2)_3$ was used as the raw material of Al, and $Co(CH_3CO_2)_2 \cdot 4H_2O$ was used as the raw material of Co. The amount was adjusted in the molar equivalence ratio of Li:Co:Al of 1.02:0.95:0.05. The process for forming the coating layer and the analysis of the characteristics thereof were performed under the same conditions as in Example 1.

Example 5

The complex lithium cobalt oxides obtained in Example 1 were used as core particles. In order to form an amorphous oxide coating layer, $LiCH_3CO_2 \cdot 2H_2O$ was used as the raw material of Li. $Al(CH_3CO_2)_3$ was used as the raw material of Al, and $Co(CH_3CO_2)_2 \cdot 4H_2O$ was used as the raw material of Co. The amount was adjusted to be in the molar equivalence ratio of Li:Co:Al of 1.02:0.9:0.1. The process for forming the coating layer and the analysis of the characteristics thereof were performed under the same conditions as in Example 1.

Example 6

Example 1 was repeated, except that complex lithium cobalt oxides (LiCoO$_2$:C-10H, Japan Chem.) were used.

Example 7

Example 1 was repeated, except that the amount of the coating layer had a molar ratio of 5 mol % for the core particles.

Example 8

Example 1 was repeated, except that complex lithium cobalt oxides (*LiCoO$_2$*:C-10H, Japan Chem.) were used as the core particles, and that the core particles, which were coated with a coating layer having the same composition as that of Example 1, were subject to heat treatment in air for 3 hours at 500° C.

Comparative Example 1

Example 1 was repeated without coating the core particle obtained in Example 1.

Comparative Example 2

Example 1 was repeated without coating the core particle obtained in Example 2.

On the basis of Examples 1-8 and Comparative Examples 1 and 2, the results of 10 the experimentation performed with respect to the capacity (i.e., cycle life) in their cycles are shown in Table 1. Table 2 shows the results of the experimentation performed with respect to the high-rate discharge in the voltage range of 3~4.2 V.

TABLE 1

Capacity in Cycle and Discharge Retention Rate After the Completion of Cycles

| | First charge capacity (mAh/g) | First discharge capacity (mAh/g) | First efficiency (%) | After 50 cycles Discharge rate (mAh/g) | After 50 cycles Discharge retention rate (mAh/g) |
|---|---|---|---|---|---|
| Example 1 | 149.8 | 144.2 | 96.3 | 135.5 | 94.0 |
| Example 2 | 149.5 | 140.8 | 94.2 | 135.2 | 96.0 |
| Example 3 | 149.8 | 142.5 | 95.1 | 136.5 | 95.6 |
| Example 4 | 148.2 | 142.1 | 95.9 | 136.4 | 96.0 |
| Example 5 | 149.5 | 144.3 | 96.5 | 136.4 | 94.5 |
| Example 6 | 149.5 | 143.2 | 95.8 | 135.3 | 94.5 |
| Example 7 | 147.8 | 140.5 | 95.1 | 134.5 | 95.6 |
| Example 8 | 149.2 | 143.2 | 96.0 | 135.2 | 94.4 |
| Comp. Example 1 | 149.8 | 143.2 | 95.6 | 130.4 | 91.1 |
| Comp. Example 2 | 149.5 | 141.3 | 94.5 | 131.2 | 92.9 |

TABLE 2

High-Rate Discharge in the Voltage Range of 3~4.2 V

| | 0.1 C per capacity (%) | | | | |
|---|---|---|---|---|---|
| | 0.1 C | 0.2 C | 0.5 C | 1 C | 2 C |
| Example 1 | 100 | 99.1 | 96.8 | 95.1 | 91.3 |
| Example 2 | 100 | 99.2 | 96.6 | 94.7 | 92.1 |
| Example 3 | 100 | 99.1 | 96.4 | 95.2 | 91.7 |
| Example 4 | 100 | 99.3 | 96.7 | 95.6 | 91.5 |
| Exam le 5 | 100 | 99.2 | 97.2 | 94.8 | 91.6 |
| Example 6 | 100 | 99.1 | 95.4 | 95.2 | 91.3 |
| Example 7 | 100 | 99 | 95.8 | 94.1 | 91.7 |
| Example 8 | 100 | 99.2 | 94.2 | 95.1 | 92.1 |
| Comp. Example 1 | 100 | 98.7 | 93.7 | 91.1 | 87.4 |
| Comp. Example 2 | 100 | 98.5 | 94.5 | 90.2 | 88.2 |

Table 1 shows that the coated core particle is superior to those that are not coated with respect to the cycle life. Table 2 shows that the coated surface is superior in high-rate discharge.

When the complex lithium metal oxides having enhanced cycle life and safety at high temperatures are used as a cathode active material of a lithium or lithium ion secondary battery, cycle life, safety and high temperature storage properties of the battery can be further improved.

What is claimed is:

1. Coated complex lithium metal oxides in which the complex lithium metal oxide core particles are coated with a coating layer,
   wherein the core particles are complex lithium cobalt oxides, which are optionally doped with Al, and
   wherein the coating layer is amorphous complex lithium cobalt oxides comprising complex lithium cobalt oxides of formula $Li_{1+x}Co_{1-x-y}A_yO_2$, wherein $0 \leq x \leq 0.1$, $0 \leq y \leq 0.5$, and A is at least one selected from the group consisting of Al, B, Mg, Ca, Sr, Ba, Na, Cr, Gd, Ga, Fe, V, Ti, Sn, Mn, Zr and Zn.

2. The coated complex lithium metal oxides according to claim 1, wherein the core particles are $LiCoO_2$ particles optionally doped with Al.

3. The coated complex lithium metal oxides according to claim 1, wherein the amount of coating layer has a mole ratio of 0.1 to 10 mol %, assuming that the coating layer is oxidized after being subjected to heat treatment.

4. A method for producing the coated complex lithium metal oxides according to claim 1, comprising the steps of:
   1) providing complex lithium cobalt oxide core particles optionally doped with Al;
   2) providing a mixture of amorphous complex lithium cobalt oxide feedstocks which form said coating layer;
   3) coating the complex lithium cobalt oxides of step 1) with the mixture of step 2); and
   4) calcinating the coated complex lithium cobalt oxides of step 3).

5. The method according to claim 4, wherein in the step 1), the core particles are $LiCoO_2$ particles optionally doped with Al.

6. The method according to claim 4, wherein in the step 2), the feedstocks of amorphous complex lithium cobalt oxide forming the coating layer is at least one selected from carbonate, nitrate, oxalate, sulfate, acetate, citrate, chloride, hydroxide, and oxide of the elements forming the coating layer, and the solvent is water or an organic solvent.

7. The method according to claim 4, wherein in the step 2), the amount of coating layer has a mole ratio of 0.1 to 10 mol %, assuming that the coating layer is oxidized after being subjected to heat treatment.

8. The method according to claim 4, in the step 3), the coating is carried Out by spray drying the mixture solution to be formed into a coating layer to the core particles after fluidizing the core particles in the air; forming a suspension formed of the mixture of the core particles and feedstocks of the coating layer followed by applying heated air while stirring; or keeping the core particles in a suspension of the mixture of the coating layer feedstock for a predetermined period of time and then drying to form a coating.

9. The method according to claim 4, wherein in the step 4), the heat treatment for forming the amorphous complex lithium cobalt oxide onto the surface of the complex lithium cobalt oxides core particle is carried out at a temperature of between 200° C. and 800° C. for 0.1 to 10 hours.

10. Complex lithium metal oxides defined in claim 1 are used as a cathode active material in a lithium or lithium ion secondary battery.

11. The coated complex lithium metal oxides according to claim 1, wherein in the coating layer, $0>y\leq0.5$ and A is selected from the group consisting of Al, B, Mg, Ca, Sr, Ba, Na, Cr, Gd, Ga, Fe, V, Ti, Sn, Mn, Zr and Zn.

* * * * *